United States Patent [19]
Gellert

[11] Patent Number: 5,795,599
[45] Date of Patent: Aug. 18, 1998

[54] INJECTION MOLDING NOZZLE GUIDE AND SEALING RING

[76] Inventor: Jobst Ulrich Gellert, 7A Prince Street, Georgetown, Ontario, Canada, L7G 2X1

[21] Appl. No.: 747,438

[22] Filed: Nov. 12, 1996

[30] Foreign Application Priority Data

Oct. 9, 1996 [CA] Canada ................... 2187497

[51] Int. Cl.⁶ .............................................. B29C 45/20
[52] U.S. Cl. ...................... 425/549; 264/328.15; 425/570
[58] Field of Search .............................. 425/549, 572, 425/570; 264/328.15

[56] References Cited

U.S. PATENT DOCUMENTS

| | | |
|---|---|---|
| 4,768,945 | 9/1988 | Schmidt et al. |
| 5,324,191 | 6/1994 | Schmidt .................. 425/549 |
| 5,326,251 | 7/1994 | Gellert. |
| 5,346,388 | 9/1994 | Gellert. |

*Primary Examiner*—Tim Heitbrink
*Attorney, Agent, or Firm*—Dalesman & Company

[57] ABSTRACT

Injection molding apparatus with a guide and sealing ring mounted around the front end of a heated nozzle. The stainless steel ring fits around the nozzle and has fingers which are bent over the front end of the nozzle to hold it in place. A thermocouple element extends through a groove in the ring and is bent into a hole in the front end of the nozzle. One of the fingers is bent over the thermocouple element to hold it in place. The outer surface of the ring has a circumferential beveled surface leading to a ridge which guides the nozzle into place during insertion and provides a secondary seal against melt leakage. A number of rearwardly extending fingers have notches to receive a wire wound around the nozzle to hold the thermocouple element and the ring itself in place.

6 Claims, 3 Drawing Sheets

INJECTION MOLDING NOZZLE GUIDE AND SEALING RING

BACKGROUND OF THE INVENTION

This invention relates generally to injection molding and more particularly to a guide and sealing ring to be mounted on a heated nozzle.

Injection molding apparatus having a number of heated nozzles extending from a melt distribution manifold is well known. During assembly, the nozzles are inserted into wells in the mold and if the nozzles are not all aligned exactly one or more of them can be damaged. As seen in U.S. Pat. No. 4,768,945 to Schmidt et al. which issued Sep. 6, 1988, providing a sealing and locating flange which bridges the insulative air space between each heated nozzle and the surrounding cooled mold is also known. The applicant's U.S. Pat. No. 5,346,388 which issued Sep. 13, 1994 shows the operating temperatures being monitored by a thermocouple element bent to extend rearwardly into a hole in the front end of each nozzle. The applicant's U.S. Pat. No. 5,326,251 which issued Jul. 5, 1994 discloses wrapping a wire around each nozzle to hold the thermocouple element in place against the nozzle. While these previous arrangements are very satisfactory for many applications, the previous sealing and locating ring requires the nozzle to be made with a seat to receive it and has no provision for a thermocouple element extending through it.

SUMMARY OF THE INVENTION

Accordingly, it is an object of the present invention to at least partially overcome the disadvantages of the prior art by providing a relatively inexpensive guide and sealing ring which can be quickly and easily mounted around the front end of a nozzle.

To this end, in one of its aspects, the invention provides injection molding apparatus having at least one heated nozzle extending forwardly into a well with a generally cylindrical wall in a cooled mold with an insulative air space extending between the heated nozzle and the surrounding cooled mold. The nozzle has a rear end, a front end, a generally cylindrical outer surface, and a melt bore extending therethrough from the rear end to the front end in alignment with a gate leading to a cavity in the mold. A guide and sealing ring is mounted around the outer cylindrical surface adjacent the front end of the nozzle prior to insertion of the nozzle into the well in the mold. The guide and sealing ring has an inner surface and an outer surface. The inner surface forms a cylindrical opening which fits around the outer cylindrical surface of the nozzle. The outer surface of the guide and sealing ring fits in the well to guide the front end of the nozzle during insertion into the well in the mold and to provide a seal between the outer surface of the ring and the wall of the well.

Further objects and advantages of the invention will appear from the following description taken together with the accompanying drawings.

DETAILED DESCRIPTION OF THE INVENTION

Figure 1:
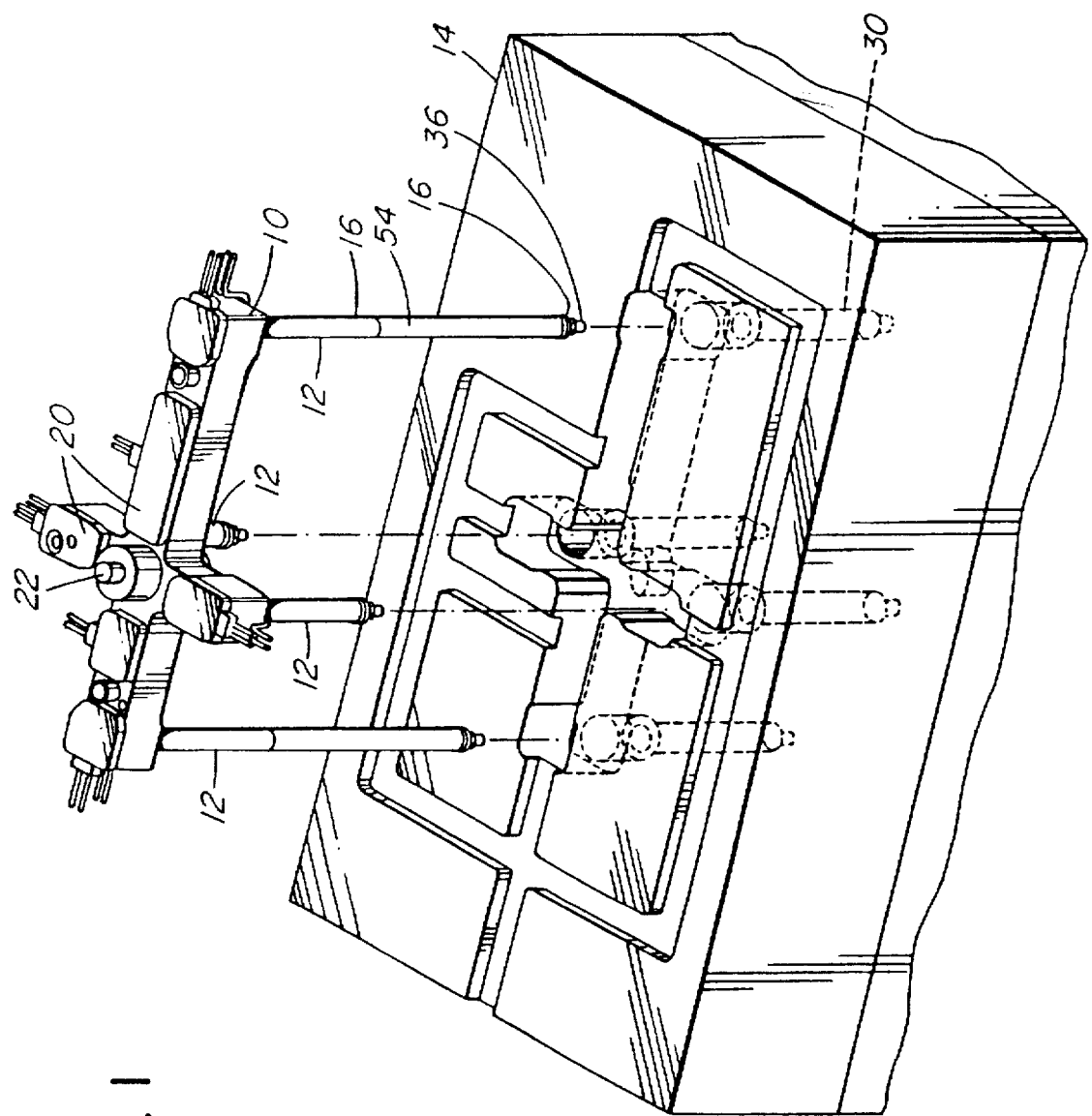
FIG. 1 is an isometric view showing four heated nozzles extending from a melt distribution manifold in position to be mounted in a mold.

Reference is first made to FIG. 1 which shows a melt distribution manifold 10 with four elongated heated nozzles 12 extending from it in position for mounting in a mold 14. In this configuration, each nozzle 12 has a threaded rear end (not shown) screwed into the melt distribution manifold 10, and a cylindrical outer surface 16 extending to a front end 18, although many other configurations can be used. The melt distribution manifold 10 is heated by electrical plate heaters 20 attached to it, and has a melt passage (not shown) branching from a central inlet 22 to extend into alignment with a central bore 24 in each nozzle 12.

Figure 2:
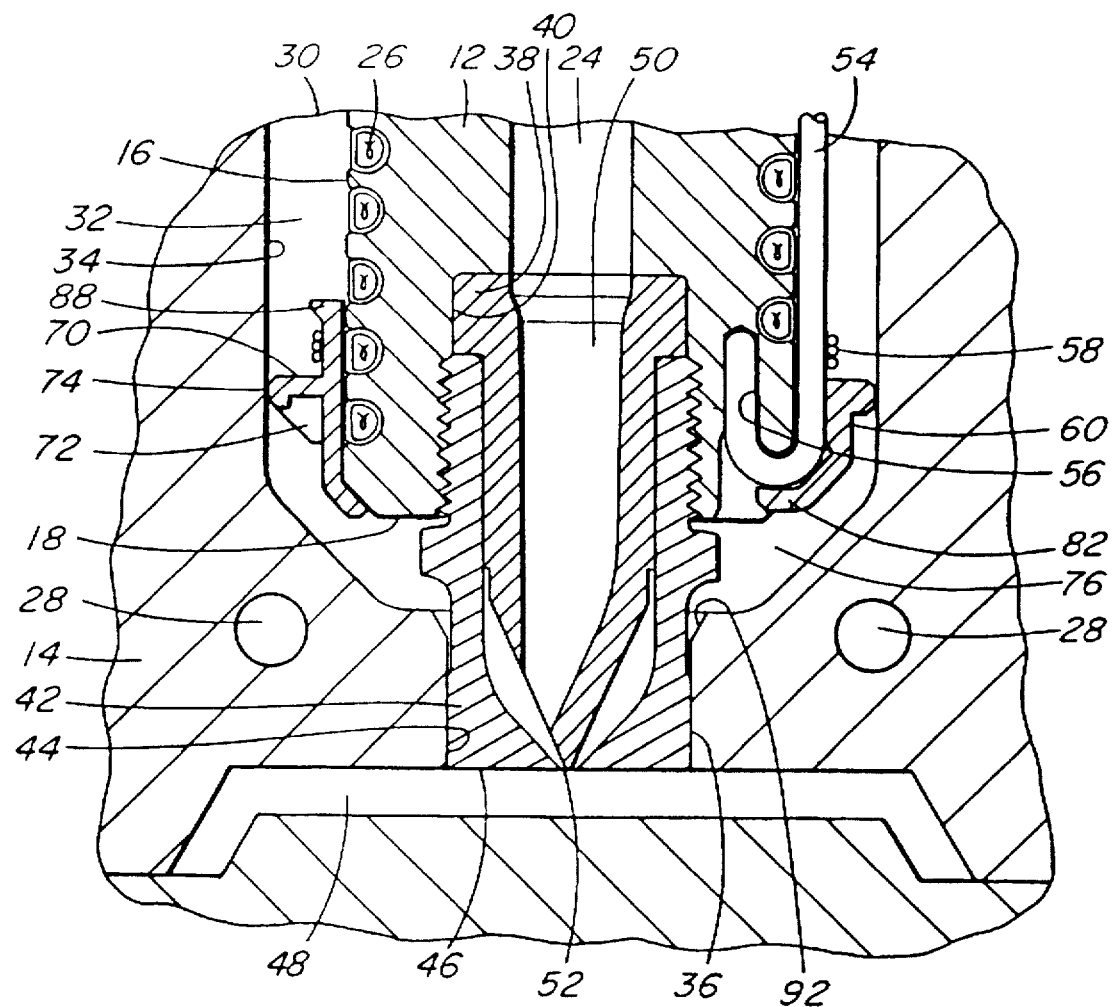
FIG. 2 is a sectional view showing a portion of one of the nozzles in FIG. 1 after receipt in the mold.

As seen in FIG. 2, each nozzle 12 is heated by an integral electrical heating element 26 which extends in a spiral around the central bore 24. The mold 14 is cooled by pumping cooling water through cooling conduits 28. Each nozzle 12 is received in a well 30 in the mold 14 with an insulative air space 32 extending between the heated nozzle 12 and the cylindrical wall 34 of the surrounding cooled mold 14.

In the configuration shown, a removable two-piece nozzle seal 36 is mounted in the front end 18 of each nozzle 12. As described in the applicant's U.S. Pat. No. 5,299,928 which issued Apr. 5, 1994, the two-piece seal 36 has a hollow inner piece 38 which is retained in place in a seat 40 in the front end 18 of the nozzle 12 by a coaxial outer piece 42 which is screwed tightly in place. As can be seen, the two-piece seal 36 extends across the insulative air space 32 and is received in a cylindrical opening 44 in the mold 14 with a front face 46 which is flush with the cavity 48 at the processing temperature. The inner piece 38 has a bore 50 which is in alignment with the central bore 24 of the nozzle to convey the melt to the gate 52 in the outer piece 42 leading to the cavity 48.

The temperature of the melt during the injection cycle is monitored by a thermocouple element 54 which extends through the air space 32 between the nozzle 12 and the mold 14 and is bent to be received in a rearwardly extending hole 56 in the front end 18 of the nozzle 12. The thermocouple element 54 is held against the cylindrical surface 16 of the nozzle by a high temperature wire 58 wrapped around the nozzle 12 as described below.

Figure 3:
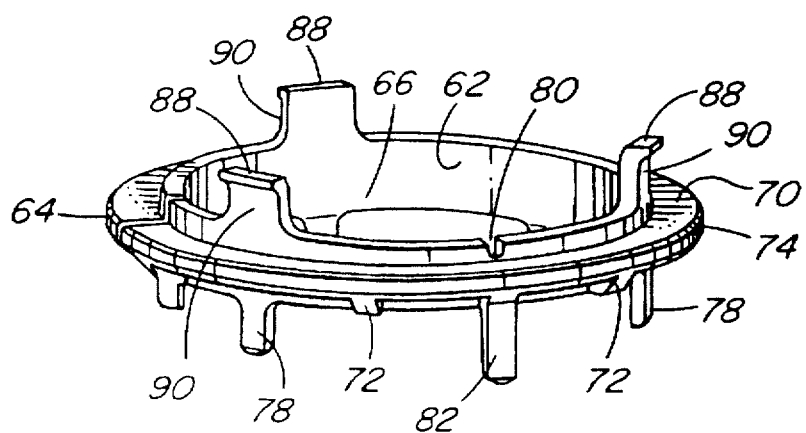
FIG. 3 is an isometric view from the rear of the guide and sealing ring shown in FIG. 2.
Figure 4:
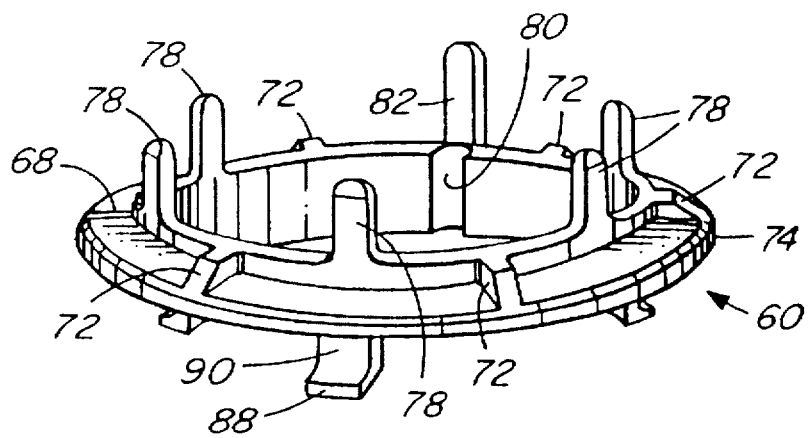
FIG. 4 is an isometric view of the same ring inverted.
Figure 5:
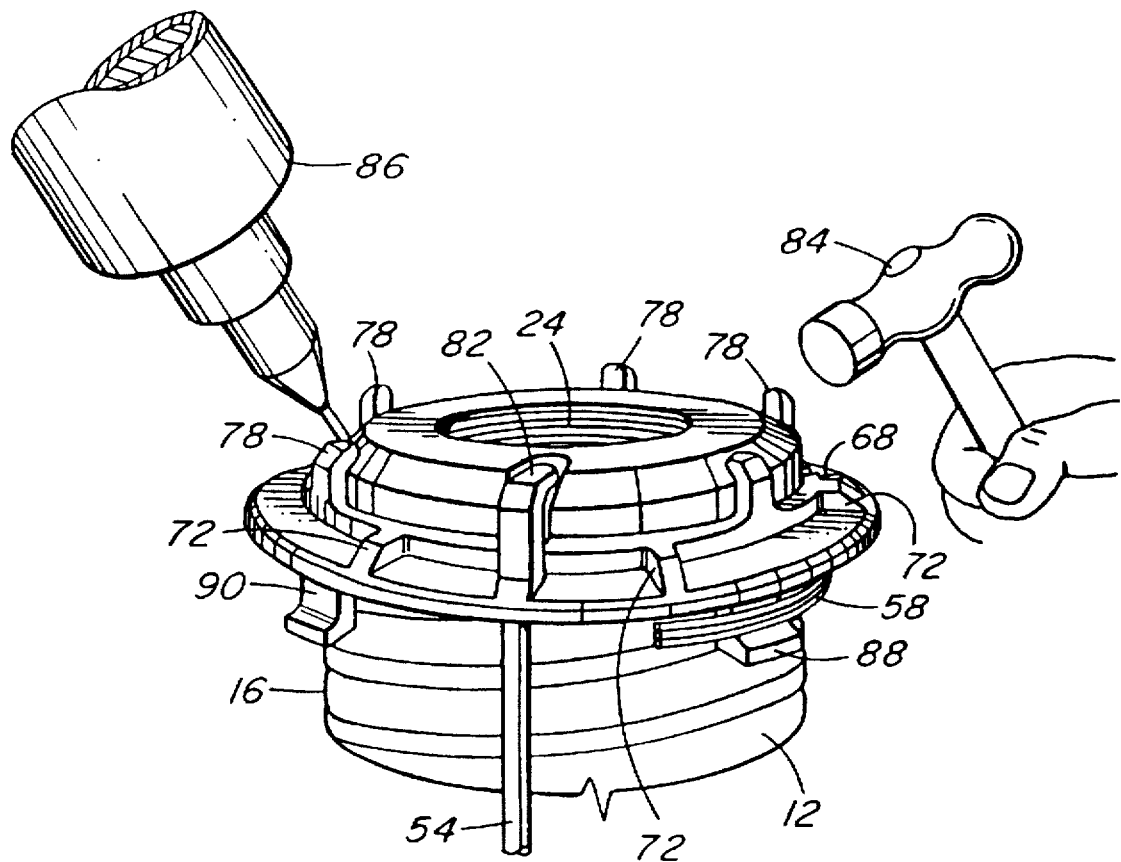
FIG. 5 is an isometric view showing the guide and sealing ring being secured in place.

As also shown in FIGS. 3–5, a guide and sealing ring 60 according to a preferred embodiment of the present invention is mounted around the front end 18 of each nozzle 12. The guide and sealing ring 60 is made of stainless steel with an inner surface 62 and an outer surface 64. The inner surface 62 forms a cylindrical opening 66 which fits around the outer cylindrical surface 16 of the nozzle 12. In this embodiment, the ring 60 has a radial gap 68 to allow for greater tolerance in the size of the outer surface 16 of the nozzle 12 and the inner surface 62 of ring 60 while still ensuring a tight fit. The width of the gap 68 has been exaggerated in the drawings for the purpose of illustration. In fact, the gap 68 is quite narrow so it can be closed by a ceramic sealant, as described below. In another embodiment, the ring can be made continuous to fit over the nozzle. In this embodiment, the outer surface 64 forms an outwardly extending flange portion 70 with a number of inwardly sloping guide ribs 72 extending forwardly therefrom. As clearly seen in FIG. 2, the size of the flange portion 70 is made to just fit inside the cylindrical well 30 to provide a secondary seal in case there is any leakage of pressurized melt into the space 76 between the two-piece seal 36 and the guide and sealing ring 60. As is well known, it is not necessary to have continuous contact between the ridge 74 and the well wall 34 as the melt itself will form a viscosity seal if they are close enough together. In other embodiments, the outer surface 64 can form a continuous slope forwardly from the flange portion 70, but having the spaced guide ribs 72 somewhat reduces heat loss from the heated nozzle 12 to the cooled mold 14.

The guide and sealing ring 60 has a number of forwardly extending fingers 78 spaced around it. The inner surface 62 of the ring 60 has a groove 80 in it and the finger 82 adjacent the groove 80 is positioned further outward and is longer than the others. As seen in FIG. 5, the guide and sealing ring 60 is mounted over the front end 18 of the nozzle 12 with the thermocouple element 54 extending through the groove 80 and the fingers 78 are then bent with a suitable tool such as a hammer 84 over the front end 18 of the nozzle 12 to secure the ring 60 in place. As clearly seen in FIG. 2, finger 82 is bent over the thermocouple element 54 to hold it in place in the hole 56. After the guide and sealing ring 60 has been mounted in place, a suitable liquid thermosetting ceramic sealant such as CERAMABOND 668 (trade name of Aremco) is applied from a pneumatic dispensing tube 86 or syringe into the spaces between the ring 60 and the nozzle 12 including the thin gap 68 and the groove 80 for the thermocouple element 54. The nozzles 12 are then heated in an oven to a temperature of approximately 200° C. to solidify the thermosetting ceramic sealant.

The guide and sealing ring 60 also has a number of rearwardly extending fingers 88 spaced around it. The rearwardly extending fingers 88 each have an outwardly facing notch 90 to receive the wire 58 wound around the nozzle to secure the thermocouple element 54 and the ring 60 itself in place against the outer surface 16 of the nozzle 12.

In use, the injection molding system is assembled by lowering the melt distribution manifold 10 with the nozzles 12 attached into place in the mold 14 as shown in FIG. 1. The sloped guide ribs 72 initially guide the nozzles 12 into the wells 30 and then the flange portion 70 aligns each nozzle 12 so that the two-piece seal 36 enters the cylindrical opening 44 without any damage to its front face 46. The cylindrical opening 44 has a beveled edge 92 to ensure there is only smooth contact between them.

After assembly, electrical power is applied to the heaters 20 on the manifold 10 and to the heating elements 26 in the nozzle 12 to heat them to a predetermined operating temperature. The shape of the flange portion 70 and sloped ribs 72 minimizes the heat loss from the heated nozzle 12 to the surrounding cooled mold 14. Pressurized melt is applied from a molding machine (not shown) to the central inlet 22 of the melt passage according to a predetermined cycle. The melt flows through the melt distribution manifold 10, nozzles 12, nozzle seals 36 and gates 52 into the cavities 48. After the cavities 48 are filled and a suitable packing and cooling period has expired, the injection pressure is released and the melt conveying system is decompressed to avoid stringing through the open gates 52. The mold 14 is then opened to eject the molded products. After ejection, the mold 14 is closed and the cycle is repeated continuously with a cycle time dependent upon the size of the cavities 48 and the type of material being molded.

While the description of the injection molding apparatus with the guide and sealing ring has been given with respect to a preferred embodiment, it will be evident that various other modifications are possible without departing from the scope of the invention as understood by those skilled in the art and as defined in the following claims.

The embodiments of the invention in which an exclusive property or privilege is claimed is defined as follows:

1. In an injection molding apparatus having at least one heated nozzle extending forwardly into a well with a generally cylindrical wall in a cooled mold with an insulative air space extending between the at least one heated nozzle and the surrounding cooled mold, the at least one nozzle having a rear end, a front end, at least a portion adjacent the front end with a generally cylindrical outer surface, and a melt bore extending therethrough from the rear end to the front end in alignment with a gate leading to a cavity in the mold, the improvement further comprising;

a guide and sealing ring mounted around the outer cylindrical surface adjacent the front end of the at least one nozzle prior to insertion of the at least one nozzle into the well in the mold, the guide and sealing ring having an inner surface and an outer surface, the inner surface forming a cylindrical opening which fits around the outer cylindrical surface of the at least one nozzle, the outer surface of the guide and sealing ring fitting in the well to guide the front end of the at least one nozzle during insertion of the at least one nozzle into the well in the mold and to provide a seal between the outer surface of the guide and sealing ring and the generally cylindrical wall of the well, guide and sealing ring having a plurality of forwardly extending fingers spaced therearound, whereby after the guide and sealing ring is mounted around the outer cylindrical surface of the nozzle, the forwardly extending fingers are bent radially inwardly over the front end of the nozzle to retain the guide and sealing ring securely in place.

2. Injection molding apparatus as claimed in claim 1 wherein the outer surface of the guide and sealing ring is beveled to form a circumferentially extending flange portion which fits in the well in the mold.

3. Injection molding apparatus as claimed in claim 2 wherein a plurality of inwardly sloping spaced guide ribs extend forwardly from the flange portion.

4. Injection molding apparatus as claimed in claim 3 wherein the front end of the nozzle has a hole to receive a thermocouple element therein and the inner surface of the guide and sealing ring has a groove therein to receive the thermocouple element therethrough.

5. Injection molding apparatus as claimed in claim 4 wherein one of the forwardly extending fingers is made to be bent over the thermocouple element on the front end of the nozzle to retain the thermocouple element in place in the opening in the forward end of the nozzle.

6. Injection molding apparatus as claimed in claim 5 wherein the guide and sealing ring has a plurality of rearwardly extending fingers spaced therearound, the rearwardly extending fingers each having an outwardly facing notch to receive a wire wound around the nozzle to secure the thermocouple element in place against the outer surface of the nozzle.

* * * * *